United States Patent [19]
Kunkel et al.

[11] Patent Number: 5,666,524
[45] Date of Patent: Sep. 9, 1997

[54] PARALLEL PROCESSING SYSTEM FOR TRAVERSING A TRANSACTIONAL DATABASE

[75] Inventors: Douglas F. Kunkel, Piedmont, Calif.; Richard K. Roth, Santa Fe, N. Mex.; Jay Robert Poulos, Salem, Oreg.

[73] Assignee: Price Waterhouse LLP, Sacramento, Calif.

[21] Appl. No.: 299,225

[22] Filed: Aug. 31, 1994

[51] Int. Cl.$^6$ .................... G06F 17/30; G06F 15/16
[52] U.S. Cl. ............ 395/603; 395/601; 364/DIG. 1; 364/282.1
[58] Field of Search .................... 395/600, 250, 395/800, 200.03

[56] References Cited

U.S. PATENT DOCUMENTS

| | | | |
|---|---|---|---|
| 4,918,593 | 4/1990 | Huber | 395/600 |
| 5,276,870 | 1/1994 | Shan et al. | 395/600 |

OTHER PUBLICATIONS

Bobrowski, "Parallel Oricle 7.1." DBMS, v6, n13, pp. 89–91. Dec. 1993.

DeWitt et al, "Parallel Database Systems: the Future of High Performance Database Systems." Communications od the ACM, v35, n6, pp. 85–99. Jun. 1992.

"Microsoft MS–DOS User's Guide and Reference Version 5.0", Microsoft Corporation, pp. 251–252 and 300–302. 1991.

Price Waterhouse Geneva View Processor Architedture/Test Objectives, Release 3, pp. 8, 9, and 18 Apr. 14, 1993.

AKSAS Alaska Statewide Accounting System Training Session—Reporting Apr. 7, 1985.

State of Oregon Department of Transportation TEAMS Detail Design Documentation, Section 9—Management Reporting Feb. 22, 1990.

*Primary Examiner*—Thomas G. Black
*Assistant Examiner*—Jack M. Choules
*Attorney, Agent, or Firm*—Kenyon & Kenyon

[57] ABSTRACT

A parallel processing system is provided which traverses logical records of an events or transactional database contained in two or more physical files in accordance with one or more view definitions specified by the user. Each view definition includes a set of processing parameters and may reference one or more of the physical files. The one or more view definitions are transformed into entries of a logic table, the logic table including a plurality of sets, each set corresponding to a respective physical file and containing entries corresponding to the view definitions which reference its respective physical file. Each set of the logic table is transformed into machine code instructions for a separate thread of the parallel processing system. Each thread operates on its respective physical file in parallel with one or more of the other threads to traverse the physical file, to retrieve information based upon the view definitions corresponding to the thread, and to store the retrieved information in extract files designated by the view definitions in formats designated by the view definitions.

20 Claims, 21 Drawing Sheets

| STORE NO. | LOCATION | MANAGER |
|---|---|---|
| 1 | | |
| 2 | | |
| 3 | | |
| 4 | | |
| 5 | | |
| 6 | | |
| 7 | | |
| 8 | | |
| ⋮ | | |

FIG. 2B

EXTRACT FILE

| CUSTOMER | ITEM | PRICE | STORE NO. | STORE ADDRESS |
|---|---|---|---|---|
| JOHN SMITH | 68 | $ 5.99 | 3 | 3 WEST MAIN ST. |
| JOHN SMITH | 54 | $ 20.00 | 6 | 3 EAST 43 ST. |
| JOHN SMITH | 35 | $100.00 | 10 | 15 WEST 81 ST. |
| JANE DOE | 101 | $ 3.99 | 1 | 5 FREE LANE |
| JANE DOE | 57 | $ 5.00 | 7 | 16 W. 120 ST. |
| . | . | . | . | . |
| . | . | . | . | . |
| . | . | . | . | . |
| . | . | . | . | . |
| . | . | . | . | . |

FIG. 4

VIEW DEFINITION STANDARD PARAMETERS SCREEN LAYOUT

```
                  VIEW DEFINITION STANDARD PARAMETERS              09/15/93

VIEW DEFINITION NUMBER :  0  ⟵45                          STATUS : I
VIEW DESCRIPTION       : VIEW DESCRIPTION

VIEW TITLE:
VIEW TITLE
                            40                      41
TABLE (LR) NUMBER  : SL1 STOCK LEDGER FILE       DDNAME : STGHTC01
                     ACTIVE DATE RANGE : 09151993 - 99999999
                                              EXCEPT AND/OR:  OR  ⟵43
                                              EXCEPT INC/EX:  I   ⟵44

NUMBER OF COPIES : 01
                        EXTRACT FILE ID  : 00         42
                                                                         46
CLEAR-CICS    3-RETURN    5-DELETE       9-UPDT/SAME                      ⟵
10-SUB-DEFIN  11-MENU    12-UPDT/NEXT   13-DESTINATIONS   14-LR LIST
15-FLD LIST   16-DDNAMES 17-SORT PARMS  18-GEN SELECT     21-COL PARMS
```

FIG. 5

VIEW DEFINITION GENERAL COLUMN PARAMETERS SCREEN LAYOUT

```
                                                                    09/15/93
            VIEW DEFINITION GENERAL COLUMN PARAMETERS

VIEW DEFINITION NUMBER: 00954              A: 00          STATUS: I
VIEW DESCRIPTION: VIEW DESCRIPTION                     51

COLUMN ID:  001             FIELD NUMBER: H65 TRANS AMT
                            LOOKUP PATH: — 54
                                            ————COMLUMN HEADING————
COLUMN WIDTH:       : 018                      TRAN
OUTPUT LENGTH (1-256) :                        AMOUNT
OUTPUT DECIMALS (0-6) :

————————EXCEPTION————————
AND/OR:  OR  EXCL/INCL (E.I):
OPERATOR (EQ.NE.GT.GE.LT.LE):
VALUE:

CLEAR-CICS  1-NEW COL    3-RETURN        5-DELETE      7-PREV COL   8-NEXT COL
ENTER-VIEW  9-UPDT/SAME 11-MENU         12-UPDT/NEXT  13-COL CALC  14-LR LIST
15-FLD LIST 16-COL SELECT 17-SORT PARMS 18-GEN SELECT 22-STD PARMS
004-RECORD SUCCESSFULLY UPDATED/ADDED
```

50 — (VIEW DEFINITION NUMBER)
53 — (COLUMN WIDTH)
55 — (OUTPUT DECIMALS)
56 — (COLUMN HEADING)

FIG. 6

VIEW DEFINITION COLUMN CALCULATIONS SCREEN LAYOUT

```
STGML64                    GENEVA                      09/15/93
             VIEW DEFINITION COLUMN CALCULATIONS

VIEW DEFINITION NUMBER : 00954    SUB-DEFINITION NUMBER : 00   STATUS: I
VIEW DESCRIPTION : VIEW DESCRIPTION

COLUMN ID : 004   61              62                    63
         OPERATOR              ---CODE---           -------VALUE-------
         (+,-,/,*)             ( CL,CO,PL )
            +                     CL03
            +                     PL04

CLEAR-CICS    3-RETURN       5-DEL LINE     7-PREV PAGE    12-UPDT/RTRN
ENTER-VIEW    8-NEXT PAGE    9-UPDT/SAME    11-MENU        21 COL PARMS
              16-COL SELECT  19-PREV COL    20-NEXT COL
004-RECORD SUCCESSFULLY UPDATED/ADDED
```

VIEW DEFINITION GENERAL SORT PARAMETERS SCREEN LAYOUT

```
STGML20                    GENEVA                        09/15/93

VIEW DEFINITION GENERAL SORT PARAMETERS

VIEW DEFINITION NUMBER : 00954  SUB-DEFINITION NUMBER: 00    STATUS : I
VIEW DESCRIPTION : VIEW DESCRIPTION
                                              71
                                              |
-----SORT FIELD------  ------TITLE FIELD----- PAGE     SUBTOTAL
                                              BREAK SUBTOTAL COUNT
504 DEPARTMENT:        T07 DEPARTMENT TITLE :   N       Y       N

CLEAR-CICS      3-RETURN         5-DEL LINE        7-PREV PAGE   8-NEXT PAGE
9-UPDT/SAME    11-MENU          12-UPDT/NEXT      13-SPEC SORT  14-LR LIST
15-FLD LIST    18-GEN SELECT    21-COL PARMS      22-STD PARMS
004-RECORD SUCCESSFULLY UPDATED/ADDED
```

VIEW DEFINITION GENERAL SELECTION PARAMETERS SCREEN LAYOUT

```
STGML21                                                          09/15/93

VIEW DEFINITION GENERAL SELECTION PARAMETERS

VIEW DEFINITION NUMBER: 00954  SUB-DEFINITION NUMBER: 00       STATUS : I
VIEW DESCRIPTION: VIEW DESCRIPTION
                  91                              92          93   STRC/
SEL   -----SELECTION FROM-----  -----SELECTION TO-----   INCL LKP LEVEL
FLD       VALUE         CODE         VALUE         CODE  EXCL PTH  NBR
N22   10                                                  _   _
N22   1050                                                _   _
Z04   93                                                  _   _    001

CLEAR-CICS  3-RETURN  5-DEL LINE  7-PREV PAGE  8-NEXT PAGE  9-UPDT/SAME  11-MENU
12-UPDT/NEXT  14-LR LIST  15-FLD LIST  17-SORT PARMS  21-COL PARMS  22-STD PARMS
004-RECORD SUCCESSFULLY UPDATED/ADDED
```

FIG. 9

VIEW DEFINITON COLUMN SELECTION PARAMETERS SCREEN LAYOUT

```
STGML68              GENEVA                          09/15/93
           VIEW DEFINITION COLUMN SELECTION PARAMETERS

VIEW DEFINITION NUMBER: 00954  SUB-DEFINITION NUMBER: 00    STATUS: I
VIEW DESCRIPTION: VIEW DESCRIPTION
                    81                      82              83    STRC/
COLUMN ID: 001     ⌐                        ⌐               ⌐
       FLD  ------SELECTION FROM------ ------SELECTION TO------ INCL LKP LEVEL
       NUM      VALUE         CODE         VALUE       CODE  EXCL PTH  NBR

Z04 93                                                   I    001

CLEAR-CICS        3-RETURN         5-DEL LINE      7-PREV PAGE    8-NEXT PAGE
ENTER-VIEW        9-UPDT/SAME     11-MENU         12-UPDT/NEXT   13-COL CALC
14-LR LIST       15-FLD LIST      19-PREV COL     20-NEXT COL    21-COL PARMS
004-RECORD SUCCESSFULLY UPDATED/ADDED
```

| ROW No. 100 | DDNAME 101 | VIEW No. 103 | FUNCT. CODE 104 | SORT/COL. 105 | FILE ID 106 | LOG REC 107 | FIELD No. 108 | LOOKUP Y/N 109 | FIELD POS 110 | FIELD LENGTH 111 | VALUES FIELD 120 | GO TO TRUE 140 | GO TO FALSE 141 |
|---|---|---|---|---|---|---|---|---|---|---|---|---|---|
| 1 | PF 11 | 1 | NR |   | PH 10 | PH 10 |   | N |   |   | EF 01 | 2 | 2 |
| 2 | PF 11 | 1 | DT | 1 | PH 10 | PH 10 | 20 | N |   |   | 53 55 | 3 | 3 |
| 3 | PF 11 | 1 | DT | 2 | PH 10 | PH 10 | 23 | N |   |   | 53 55 | 4 | 4 |
| 4 | PF 11 | 1 | DT | 3 | PH 10 | PH 10 | 24 | N |   |   | 53 55 | 5 | 5 |
| 5 | PF 11 | 1 | DT | 4 | PH 10 | PH 10 | 21 | N |   |   | 53 55 | 6 | 6 |

| | | | | | | | | | | | | | |
|---|---|---|---|---|---|---|---|---|---|---|---|---|---|
| 6 | PF 11 | 1 | KT | 1 | PH 10 | PH 10 | 20 | N | | | 53 55 | 7 | 7 |
| 7 | PF 11 | 1 | WR | | | | | | | | | | |
| 8 | PF 11 | 2 | NR | | PH 10 | PH 10 | | | | | EF 02 | 9 | 9 |
| . | | | | | | | | . | | | | | |
| . | | | | | | | | | | | | | |
| 20 | PF 11 | 2 | WR | | | | | | | | | | |
| 21 | | | ES | | | | | | | | | | |

FIG. 11B

| | | | | | | | | | | | | |
|---|---|---|---|---|---|---|---|---|---|---|---|---|
| 22 | PF 12 | 1 | NR | | PH 10 | PH 10 | | | | EF 01 | 2 3 | 2 3 |
| 23 | PF 12 | 1 | DT | 1 | PH 10 | PH 10 | 20 | | | 53 55 | 2 4 | 2 4 |
| 24 | PF 12 | 1 | DT | 2 | PH 10 | PH 10 | 23 | | | 53 55 | 2 5 | 2 5 |
| 25 | PF 12 | 1 | DT | 3 | PH 10 | PH 10 | 24 | | | 53 55 | 2 6 | 2 6 |
| 26 | PF 12 | 1 | DT | 4 | PH 10 | PH 10 | 21 | | | 53 55 | 2 7 | 2 7 |
| 27 | PF 12 | 1 | KT | 1 | PH 10 | PH 10 | 20 | | | 53 55 | 2 8 | 2 8 |
| 28 | PF 12 | 1 | WR | | | | | | | | | |

FIG. 11C

| 29 | PF 12 | 3 | NR | | PH 10 | PH 10 | | | | | EF 03 | 3 0 | 3 0 |
|----|-------|---|----|--|-------|-------|--|--|--|--|-------|-----|-----|
| .  |       |   |    |  |       |       |  |  |  |  |       |     |     |
| .  |       |   |    |  |       |       |  |  |  |  |       |     |     |
| 38 | PF 12 | 3 | WR |  |       |       |  |  |  |  |       |     |     |
| 39 | PF 12 |   | ES |  |       |       |  |  |  |  |       |     |     |
| 40 |       |   | EN |  |       |       |  |  |  |  |       |     |     |

FIG. 11D

| 100 | 101 | 103 | 104 | 105 | 106 | 107 | 108 | 109 | 110 | 111 | 120 | 140 | 141 |
|---|---|---|---|---|---|---|---|---|---|---|---|---|---|
| 2 | PF11 | 004 | BC | | | | | Y | | | REFERENCE FILE "STORE" | 3 | 3 |
| 3 | PF11 | 004 | BT | | PH10 | | | 20 | Y | | | 4 | 4 |
| 4 | PF11 | 004 | RL | | | | | Y | | | | 5 | 5 |
| 5 | PF11 | 004 | DL | 5 | | | | 20 | Y | | | 6 | 6 |

FIG. 11E

PARALLEL PROCESSING SYSTEM FOR TRAVERSING A TRANSACTIONAL DATABASE

FIELD OF THE INVENTION

The present invention relates to the art of data processing, and, more particularly to a method of traversing a large database based upon user-defined criteria, retrieving information from the database based on the user-defined criteria, and providing information in a user specified format.

BACKGROUND OF THE INVENTION

A persistent problem facing a user of a large database is how to access needed information efficiently and in a convenient format. In general, a large business will continually collect and store data in a variety of formats for a variety of uses. Many of these files are generally referred to as transaction or event files because each entry, or set of entries, contains information regarding a discrete event or transaction which may occur independent of other events or transactions in the file.

For example, a large retail store chain might maintain databases comprising customer information which includes addresses, telephone numbers etc., and account history information which might include, for each customer, a list of each item purchased, the date of purchase, the price, and the manner of payment. Such files, which may be updated on a daily or weekly basis, and which may span several years of transactions, are obviously quite voluminous for large companies. As such, these files are generally stored on external storage devices such as tape drives, and disk drives.

The sheer size of, for example, an account history file spanning 3 years, combined with the fact the file is stored on relatively slow external storage devices, makes retrieving and processing data from these files a time consuming task. As a result, such files are not often used in their original form. Instead, a business will generally wish to evaluate the data in these files and form summary files, e.g., of the total amount of purchases in a specific time period.

As a result, a corporation will set up intermediate "summary files" which contain information culled from event or transaction files. The summary files are then updated as new events or transactions are collected. For example, if a transaction file contains payroll information which indicates the hours spent by each employee on each project as well as their pay, a summary file might be created to keep a running sum of the hours which each employee spent on each project. As new payroll entries are input into the transaction file, the summary file will be updated by simply adding the new transaction data to the previously stored sums in the summary file.

As a result, when a user requests information regarding the hours which employee John Smith spent on each of his projects, the system will access the summary file, rather than the original payroll transaction file, to provide the requested information. At most, therefore, the system will need to search the current days' entries to update the summary file and obtain the most current requested information. This reduces the processing time. Such "summary file" based systems, however, have certain drawbacks. For example, if the type of information which the user desires is not maintained in the summary file, then the information cannot be readily obtained. A significant burden is thereby placed on "summary file" designers to anticipate or speculate on future information and business needs and keep that summary information readily available.

An additional problem arises when data in the summary files must be changed retroactively. Assume, for example, that resolution of a collective bargaining dispute with the employee union has resulted in a retroactive pay increase from $7.00/hr. to $8.00/hr. In the above prior art system, a pay differential must be calculated and, then, all summary files containing derivatives of pay information must be adjusted to reflect the impact of the retroactive change.

As a result, prior art systems suffer from an inherent lack of flexibility due to the fact that their output data is based on the contents of summary files rather than the original transaction or event files. As such, a need exists for a system which can quickly compile information in a desired format from the original transaction or event files.

SUMMARY OF THE INVENTION

In accordance with the present invention, a parallel processing system for traversing events or transactional databases is provided which can process voluminous event or transaction files in a quick and efficient manner thereby reducing the need to maintain summary files.

In accordance with the present invention, a set of search algorithms are specified in a logic table which is used to traverse a set of physical files containing individual events or transactions. The logic table represents an embodiment of a "non-procedural" language. However, consistent with the present invention, it would be possible to express a logic table in a "procedural" language such as "Pascal" or "C".

Each individual event or transaction is called a logical record. The set of similarly formatted logical records is called a logical file. A logical file, for example, could be a set of logical records containing information regarding purchase events (credit card purchases for example) occurring over a period of time, e.g., 3 years. This "purchase history" logical file, for example, might span 3 physical files: physical file 1 including purchases for the current calendar year (year 0), physical file 2 including purchases for the previous calendar year (year −1), and physical file 3 including purchases for the calendar year prior to that (year −2). The physical files may be stored on tape or disk.

In accordance with the present invention, each physical file in a logical file is searched in accordance with a respective search algorithm by a separate thread. In a multiprocessor system separate threads can be executed on separate processors. If the number of processors is equal to or greater than the number of threads, each thread's search algorithm can traverse its respective physical file in parallel with the algorithms of the other threads. For example, if there are 3 threads and 3 processors, all 3 threads will traverse their respective physical files in parallel. Moreover, even if the number of threads exceeds the number of processors, at least some of the search algorithms will proceed in parallel. For instance, if there are 4 threads in a system that has three processors, the threads will have to share processors so that at any moment in time only 3 threads can be executing.

In accordance with the present invention, the search algorithm is generated in a logic table from one or more views. A view is defined as a particular set of parameters based on a logical file for forming an extract file. As such, a view might specify that certain data or classes of data should be retrieved from the logical records of the logical file, processed in a specified manner, and written to an extract file in a specified format. In a typical application, there may be many views defined with respect to a single logical file and many different logical files which are of interest to a user.

In accordance with the present invention, all views, which may be defined with respect to different logical files and different physical files, are incorporated into a combined logic table. The logic table is arranged into "sets", wherein each set corresponds to a different physical file and therefore to a different thread. A given set will contain each view which requires information from the physical file corresponding to that set.

In accordance with the present invention, the logic table is converted into machine code, the machine code thereby forming the search algorithm for each thread, each thread operating on its respective physical file. The threads are then executed in parallel in accordance with their respective machine code to traverse the physical files containing the logical records. Moreover, since the search algorithm implemented by the machine code for each thread will extract all information needed by all views from the respective physical file, each physical file is traversed only once, regardless of the number of views which are defined or the number of logical files which are searched. As a result, by searching the physical files in parallel, and by traversing each physical file only once regardless of the number of views, the processing time for traversing a large database is greatly reduced in accordance with the present invention. This makes it feasible to derive information from the original event or transaction files rather than summary files.

For example, assume that a user wishes to generate three separate reports based upon information contained in the purchase history logical file described above: report #1 listing, by item number, all purchases by individuals named John Smith during the years 0 through −2 inclusive, report #2 listing, by customer name, all purchases in years 0 through −1 exceeding $500, and report #3 listing, for each customer, a cumulative sum of their credit card purchases during the current year (0).

In accordance with the present invention, a logic table will be generated, the logic table segregated into three sets, one for each of the three physical files of the purchase history logical file.

A view definition for report #1 would be created and stored in each of the three sets because report #1 requires information from each of the three physical files. The view definition for report #1, which would be copied into each of the three sets, might include the following parameters: retrieve all entries in the physical file whose "customer field" is John Smith, put the contents of the customer field of all retrieved entries in column 1 of an extract file for view 1, put the contents of the "item" field of all retrieved entries in column 2, put the contents of the "price field" of all retrieved entries in column 3, and sort the retrieved entries by the contents of the "item" field.

A view definition for report #2 would be created and stored only in the first and second sets because report #2 requires information only from physical file 1 (year 0) and physical file 2 (year −1). The view definition for report #2, which would be copied into each of the first two sets, might include the following parameters: retrieve all entries in the physical file which have a "price field" which is greater than $500, put the contents of the "customer field" of all retrieved entries in column 1 of an extract file for view 2, put the contents of the "item" field of all retrieved entries in column 2, put the contents of the "price field" of all retrieved entries in column 3, and sort the retrieved entries by the contents of the "customer" field.

A view definition for report #3 would be created and stored only in the first set because report #3 requires information only from physical file 1 (year 0). The view definition for report #3, which would be present only in the first set, might include the following parameters: retrieve all entries in the physical file, put the contents of the "customer field" of all retrieved entries in column 1 of an extract file for view 3, put the contents of the "item" field of all retrieved entries in column 2 of the extract file, put the contents of the "price field" of all retrieved entries in column 3 of the extract file, put, in column 4 a "0" in preparation for calculating the running sum discussed above, sort the retrieved entries by the contents of the "customer" field, and put in column 4 of each entry of the extract file a sum of the contents of the "price field" (column 3) of the entry and the contents of column 4 for the previous entry for the customer identified in column 1 of the entry.

The above view definitions in the logic table would then be transformed into machine code instructions for each of three threads, one thread for each set of the logic table. Each of the three threads would traverse its respective physical file as follows:

Thread 1 would traverse physical file 1. Thread 1 would access the first entry of physical file 1, and perform the following steps:
 1. if the customer name field is John Smith, then put the contents of the customer field in column 1 of an extract entry, put the contents of the "item" field in column 2, put the contents of the "price field" in column 3, collect the sort fields in preparation for sorting the entry with previous entries by the contents of the "item" field, and write the extract entries to an extract file for view 1;
 2. if the "price field" is greater than 500, then put the contents of the "customer field" in column 1 of an extract entry, put the contents of the "item" field in column 2, put the contents of the "price field" in column 3, sort the entry with previous entries for view 2 by the contents of the "customer" field, and write the extracted entries to an extract file for view 2;
 3. put the contents of the "customer field" in column 1 of an extract entry, put the contents of the "item" field in column 2, put the contents of the "price field" in column 3, collect the sort fields in preparation for sorting the entry with previous entries for view 3 by the contents of the "customer" field, put, in column 4 a "0" in preparation for calculating the running sum discussed above; and write the extracted entries to an extract file for view 3; and
 4. repeat steps 1 through 3 for all remaining entries in physical file 1.

Thread 2 would traverse physical file 2. Thread 2 would access the first entry of physical file 2, and perform the following steps:
 1. if the "customer field" is John Smith, then put the contents of the "customer field" in column 1 of an extract entry, put the contents of the "item field" in column 2, put the contents of the "price field" in column 3, collect the sort fields in preparation for sorting the entry with previous entries by the contents of the "item field", and write the extracted entries to an extract file for view 1;
 2. if the "price field" is greater than 500, then put the contents of the customer field in column 1 of an extract entry, put the contents of the "item field" in column 2, put the contents of the "price field" in column 3, collect the sort fields in preparation for sorting the entry with previous entries for view 2 by the contents of the "customer field", and write the extracted entries to an extract file for view 2; and 3. repeat steps 1 through 2 for all remaining entries in physical file 2.

Thread 3 would traverse physical file 3. Thread 3 would access the first entry of physical file 3, and perform the following steps:
1. if the "customer field" is John Smith, then put the contents of the customer field in column 1 of an extract entry, put the contents of the "item field" in column 2, put the contents of the "price field" in column 3, collect the sort fields in preparation for sorting the entry with previous entries by the contents of the "item field", and write the extracted entries to an extract file for view 1; and
2. repeat step 1 for all remaining entries in physical file 3.

Once the threads complete the above procedure, each extract file is sorted in accordance with the sort fields specified by each view definition. Then, for each entry in the extract file for view 3, add the contents of column 3 of the entry to the contents of column 4 of the previous entry. Then, store the result in column 4 of the entry unless the entry is the first entry in the extract file for the customer identified in column 1 of the entry.

Each of the above three threads would operate independent of each other and, if the system includes at least 3 processors, each of the three threads would operate in parallel. As demonstrated above, each entry of each physical file is accessed only once despite the fact that thread 1, for example, is generating three separate reports.

Since the physical files are stored on external devices such as tape drives and disk drives, the time required to access a given entry on a physical file far exceeds the time which the thread needs to process the data once it is retrieved. As such, by accessing each entry of the physical file only once, and accessing entries in the sequence they are physically recorded regardless of the number of views defined with respect to the physical file, processing time is reduced. Moreover, by processing the files in parallel, processing time is reduced even further.

In accordance with a further embodiment of the present invention, processing time is further reduced through the implementation of an overlapped I/O feature of the present invention.

In accordance with the present invention, an input buffer set is provided for each thread, each input buffer set including one or more input buffers, each input buffer holding one data block, with the transfer of data blocks from the physical medium to the input buffers occurring in the same sequence as blocks are stored on the physical medium so as to minimize the delays attributable to switching from one block to the next. In accordance with an embodiment of the present invention the size of the data block is selected as a function of the nature of the physical medium in which the physical file resides. The size of the data block being set equal to the largest size which can be retrieved from its respective physical medium without necessitating mechanical movement of an access arm if the data is stored on disk.

By selecting the size of the data block in this manner, the system according to the present invention retrieves the maximum amount of data into an input buffer in the minimum possible processing time.

In accordance with a further embodiment of the present invention, a plurality of input buffers are provided in each input buffer set to further minimize data retrieval time. In accordance with this embodiment of the present invention, after a first input buffer is loaded with its block of data, while other blocks of data are being loaded into the next input buffers, the thread corresponding to the physical file for that input buffer set traverses the first input buffer in accordance with its processing algorithm, thus overlapping the retrieval of data blocks with searching. Optimally, the number of input buffers in the input buffer set is chosen so that by the time the thread has traversed the last of the input buffers, the first input buffer has already been reloaded with a new data block from the physical file. As a result, the thread does not have to wait for data blocks to be loaded into the buffers before commencing processing of the data block.

In accordance with a further embodiment of the present invention, an output buffer set is provided for each extract file referenced by the logic table. Each output buffer set, in turn, includes one or more output buffers, each of the output buffers holding one block of data. The size of the data block is selected as a function of the nature of the physical medium in which the corresponding extract file resides as described above with regard to the input buffers. A plurality of output buffers may be provided to further increase processing speed by allowing one buffer to be written while another is being filled.

BRIEF DESCRIPTION OF THE DRAWINGS

FIG. 2B shows an illustrative reference table in accordance with the present invention.

FIG. 4 illustrates an extract file in accordance with the present invention.

FIG. 5 shows a View Definition Standard Parameters screen in accordance with an embodiment of the present invention.

FIG. 6 shows a View Definition General Column Parameters screen in accordance with an embodiment of the present invention.

FIG. 7 shows a View Definition Column Calculations screen in accordance with an embodiment of the present invention.

FIG. 8 shows a View Definition General Sort Parameters screen in accordance with an embodiment of the present invention.

FIG. 9 shows a View Definition General Selection Parameters screen in accordance with an embodiment of the present invention.

FIG. 10 shows a View Definition Column Selection Parameters screen in accordance with an embodiment of the present invention.

FIGS 11A–11D shows the logic table of FIG. 3 in more detail.

FIG. 11E shows an illustrative portion of the logic table of FIG. 3 which implements a look-up to a reference table.

DETAILED DESCRIPTION OF THE INVENTION

Figure 1:
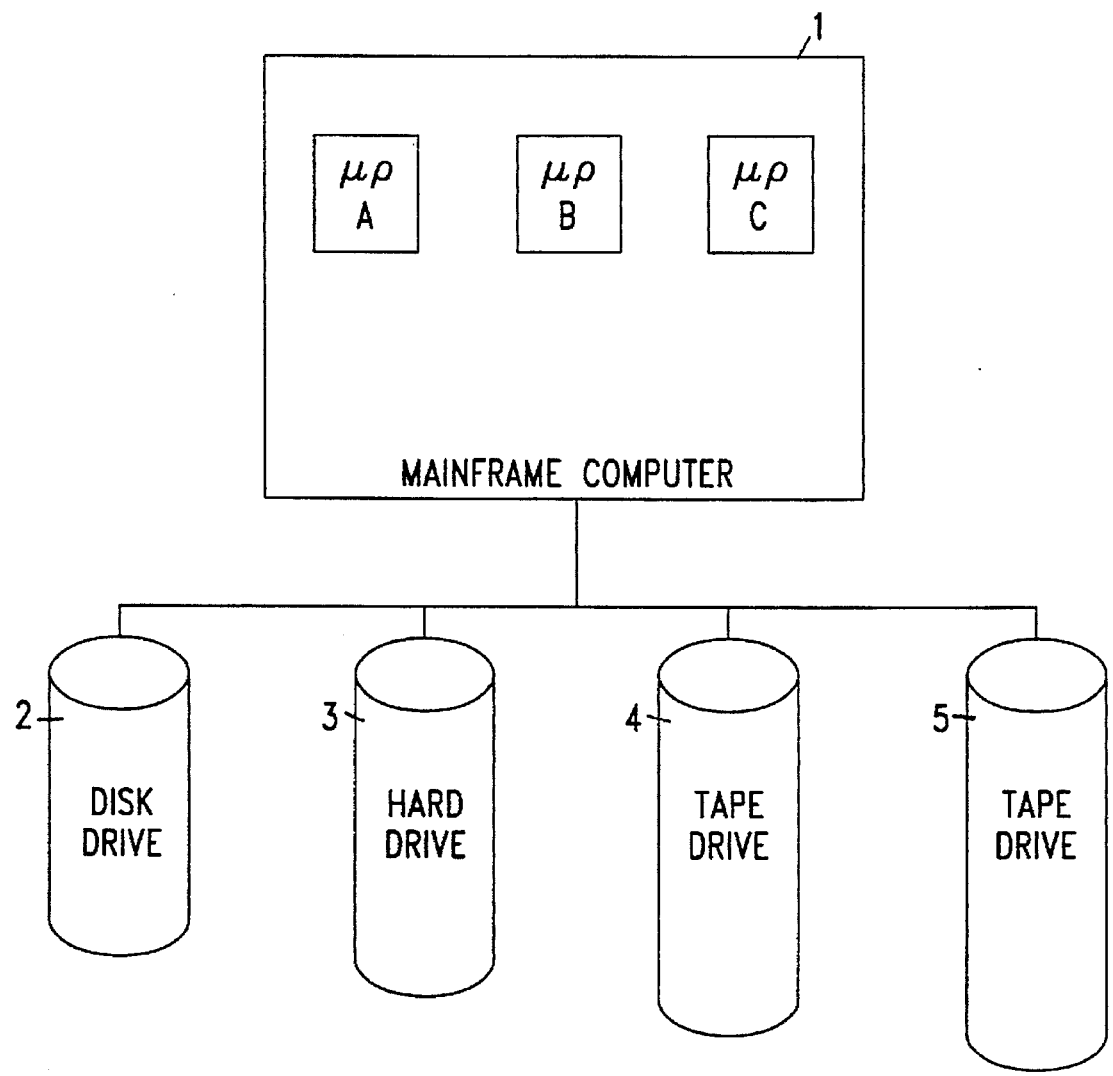
FIG. 1 shows an illustrative processor system according to an embodiment of the present invention.

Referring to FIG. 1, a processor system according to the present invention may include an IBM mainframe computer 1 (including, for example, 3 processors A, B, C) coupled to a variety of external storage devices such as a disk drive 2, hard drive 3, and tape drives 4, 5.

In accordance with the present invention, the processors search through an events (or transactional) database in accordance with one or more view definitions which are contained in a logic table.

Figure 2:
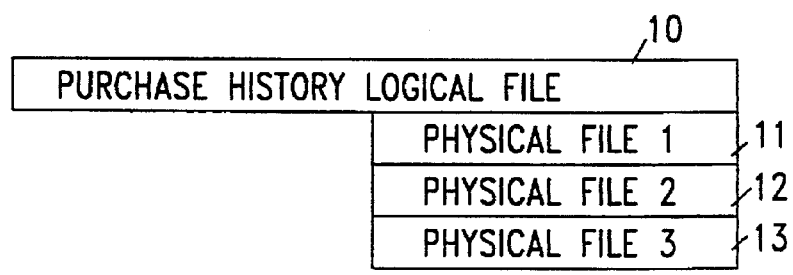
FIG. 2 shows an illustrative logical file in accordance with an embodiment of the present invention.
Figure 2A:
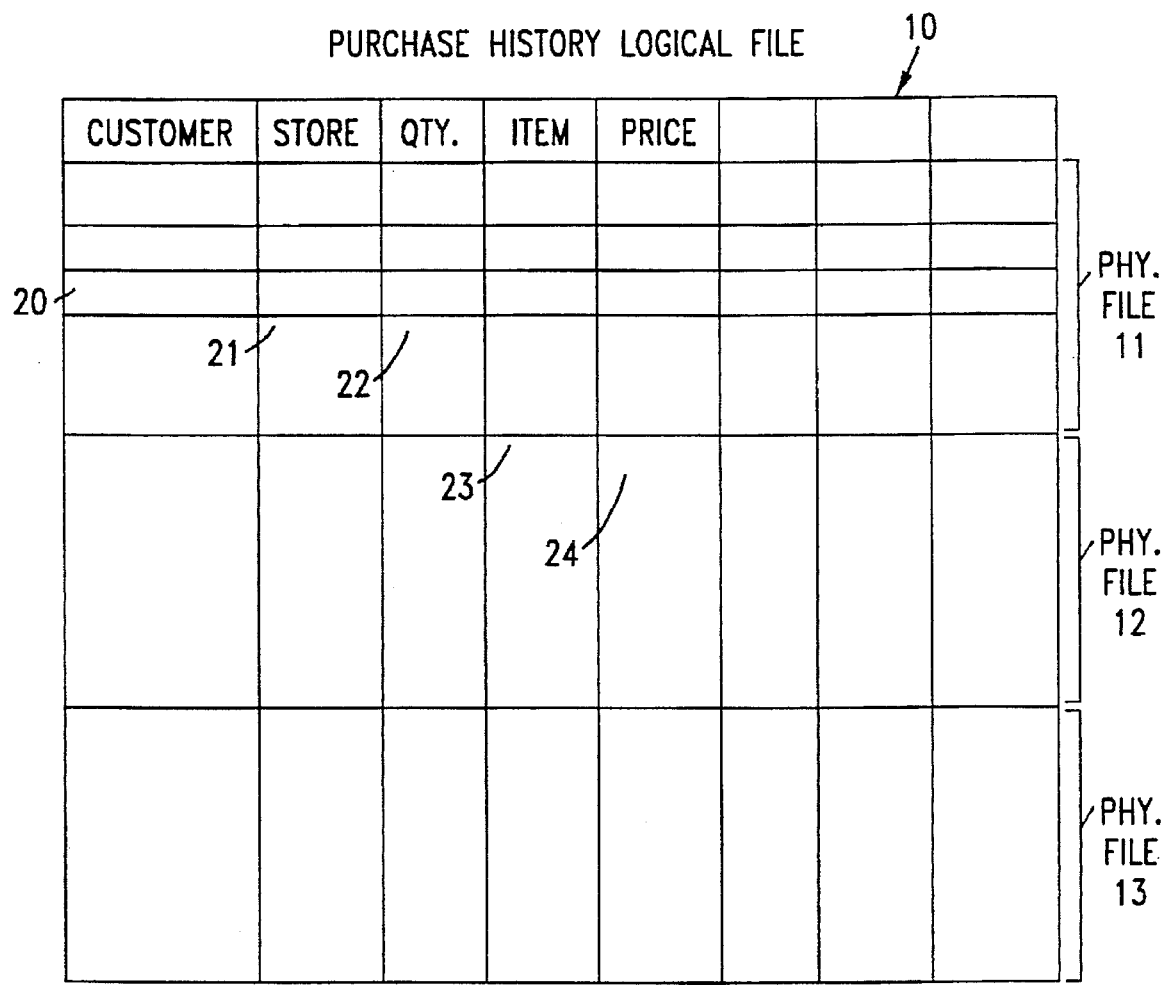
FIG. 2A shows the logical records of the logical file of FIG. 2 in more detail.

As discussed above, an events database is a database which contains files which store information regarding events. An events database may include a plurality of logical files, each logical file including a plurality of logical records. A logical file, in turn, may reside in a plurality of physical files. An example of a logical file could be a file containing purchase history records. Referring to FIG. 2, a Purchase History Logical File 10 might reside in physical file 11, physical file 12, and physical file 13. Referring to FIG. 2A, the purchase history logical file 10 might have columns for: customer name 20, store 21, quantity 22, item 23, and price 24. Each row of logical file 10 being a different purchase history logical record. While not illustrated in FIGS. 2 and 2a, it should be understood that each physical file may contain logical records belonging to several different logical files.

Physical file 11 might include, for example all logical records (entries) of the purchase history logical file for the current calendar year (year 0), with physical file 12 including all entries of the purchase history logical file for the previous calendar year (year −1), and with physical file 13 including all entries of the purchase history logical file for the next preceding calendar year (year −2).

Figure 2B:
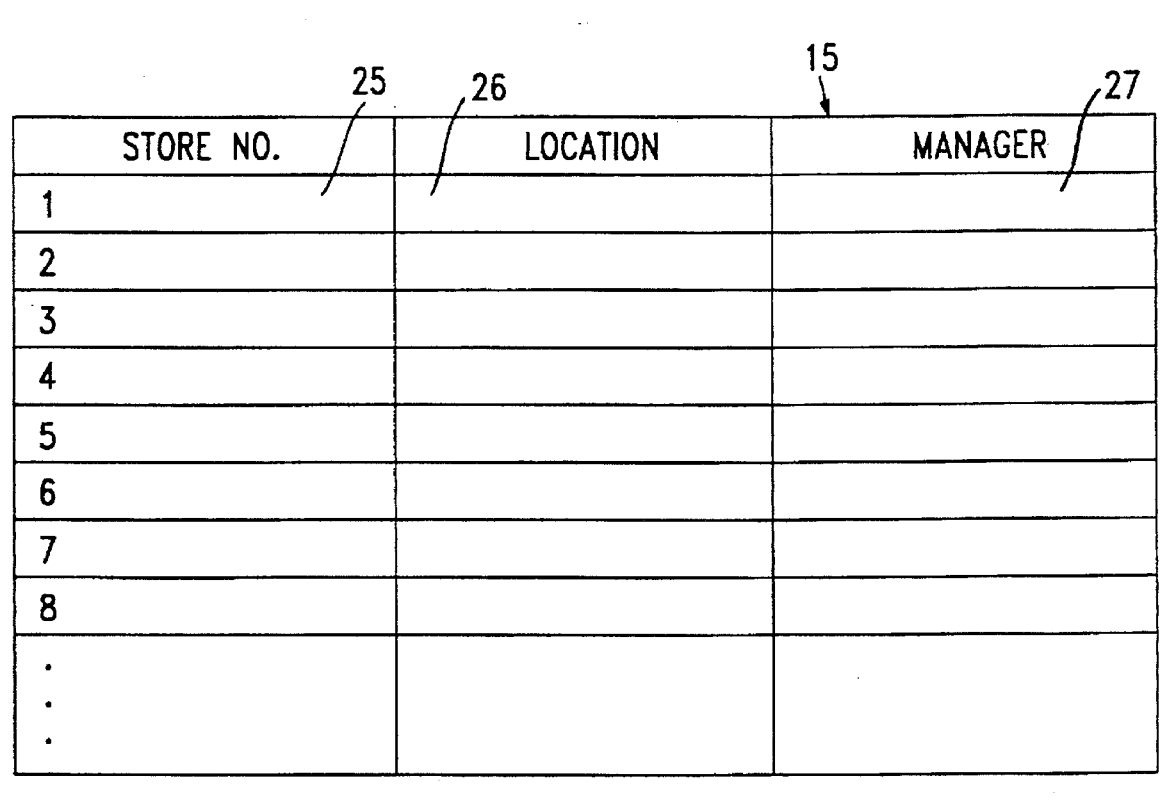

In addition to events and transactional databases, reference tables can also be searched in accordance with the present invention. Reference tables contain reference information rather than event or transactional information. For example, while an events database might include information on customer transactions for a chain of stores, a reference table might indicate the location of each store in the chain and the names of the managers at each store. Referring to FIG. 2B, a reference table store 15 includes columns for store no. 25, location 26, and manager 27.

As explained above, an events database comprises a series of logical files, and each logical file may be stored in one or more physical files. In accordance with the present invention, the physical files of the events database are searched in parallel in order to increase efficiency. In accordance with a search of a particular physical file, each of a plurality of view definitions which relate to that physical file are combined through the use of the logic table to form a single search algorithm. This algorithm is applied once through the physical file to obtain search results for all of the view definitions for the physical file, the search results being processed in accordance with the view definitions and written to designated extract files.

In accordance with the present invention, a logic table is generated which controls the manner in which the logical file(s) is processed. The logic table represents an embodiment of a non-procedural language. However, consistent with the present invention, the logic table could be expressed in a procedural language such as "Pascal" or "C". In addition to logical files, a logic table can also search a plurality of reference tables. As explained above, reference tables, unlike logical files, do not contain event records. Instead, they contain reference information which may be useful to facilitate presentation and interpretation of event file data from the logical records.

Figure 3:
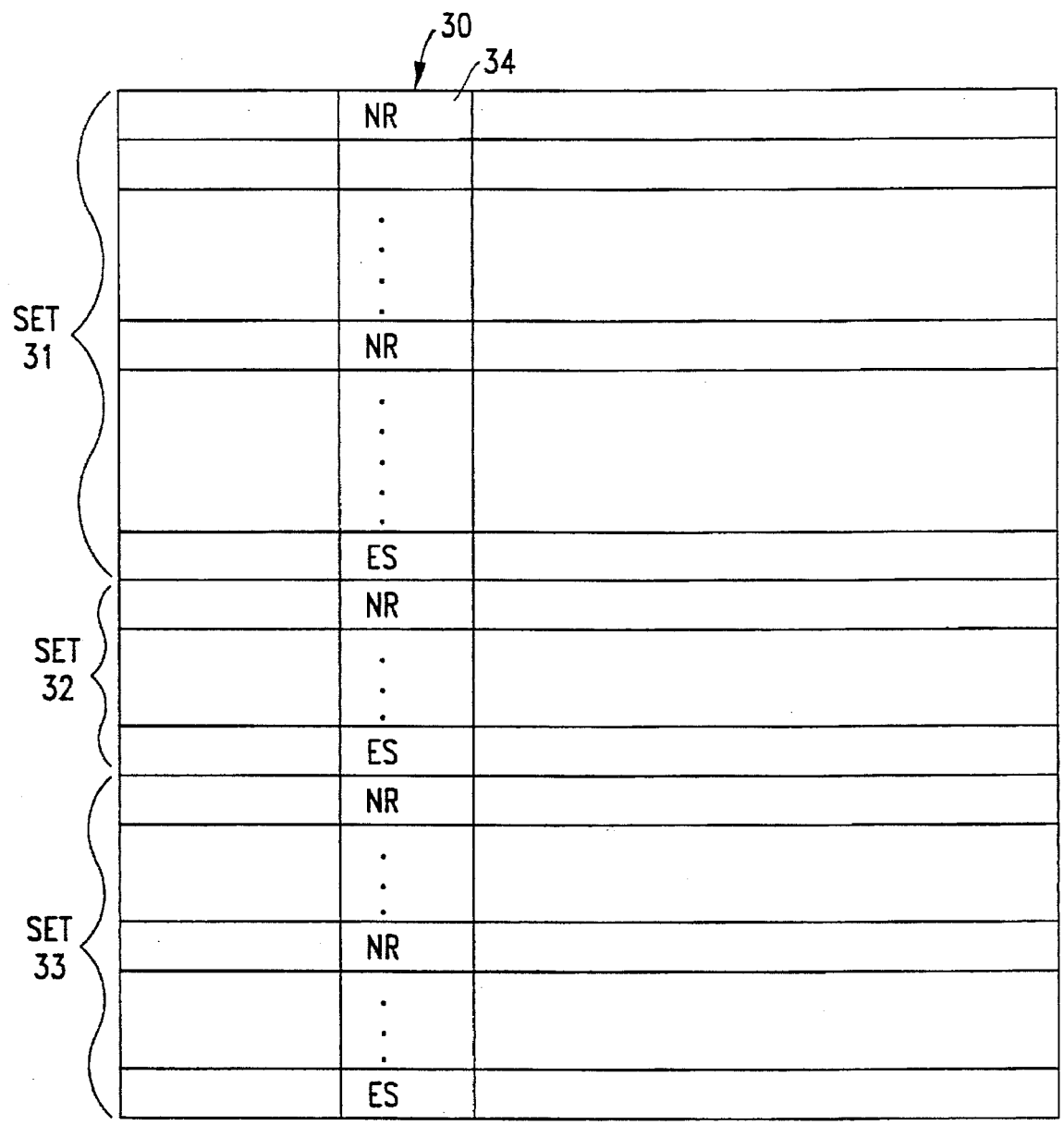
FIG. 3 shows a logic table in accordance with the present invention.

Referring to FIG. 3, a logic table 30 is composed of a number of entries. Each entry includes a function code field 34, and, in general, the entries or rows of the logic table will be referenced herein by their function code field.

The logic table can be divided into a plurality of "sets". A function code field of "ES" (an ES row) indicates the end of a set. FIG. 3, for example, shows an exemplary "non-procedural language" logic table with 3 sets, a first set corresponding to physical file 11, a second set corresponding to physical file 12, and a third set 33 corresponding to physical file 13 of the Purchase History Logical File. As will be explained in more detail below, each set corresponds to a separate thread in the parallel processing system.

A function code entry of "NR" (new request) identifies the beginning of a new view. As discussed below, subsequent entries which may appear between two NR rows further refine that view. Each new request ("NR") in the logic table has a corresponding view definition.

A view definition defines the manner in which a particular logical file is processed. In addition, the view definition controls the manner in which the results of the search will be formatted for the user. In accordance with an embodiment of the present invention, a user creates a view definition through the use of a series of screens. Once a view definition is created, it is incorporated into the logic table in an NR row and one or more additional rows in the logic table.

In accordance with an embodiment of the present invention, a view definition menu allows a user to display a list of pre-existing view definitions, display a particular existing view definition, or create a new view definition. The view definition menu may comprise a plurality of screens such as those which are discussed below with regard to FIGS. 5–10. These screens can be accessed either from a main menu (not shown) or from within the other screens. For example, the View Definition General Column Parameters Screen shown in FIG. 6 can be accessed from the View Definition Standard Parameters Screen of FIG. 5 by entering the number "21" from the menu 46 at the bottom of FIG. 5.

When creating a new view definition, or editing an existing view definition, the user will enter a View Definition Standard Parameters Screen which sets forth the standard parameters that are applied to the view definition. Referring to FIG. 5, the View Definition Standard Parameters Screen indicates the Logical Record No. 40, the date range of the search 41, and the Extract File No. 42.

In order to specify which columns will be included in the extract file, the View Definition General Column Parameters Screen is accessed. Each column in the view definition is identified and sequentially numbered. Referring to FIG. 6, a column id field 50 identifies the column number (e.g. 1–999) whose attributes are defined in the remainder of the screen. The Field No. field 51 designates the field from the logical record or reference table which will appear in the column. In addition, the column heading 52, column width 53, etc can be specified from this screen.

Referring to FIG. 7, a View Definition Column Calculations Screen allows calculations to be assigned to the columns specified in the View Definition General Column Parameters Screen. The column id field 60 designates the column in which the calculated value is to appear, and the operator 61, code 62, and value 63 fields define the calculation to be performed. The operator field 61 provides designations for addition, subtraction, multiplication, and division. The code field provides designations for current column value (CL), previous column value (PL), or constant (CO). The value field 63 specifies the value of a constant defined in the code field 62. Assume, for example, that a user wished to keep a running sum of column 3 in column 4. Referring to FIG. 7, this could be implemented as follows: the column id would be column 4, in the first entry the operator would be "+" and the code would be "CL 03", and in a second entry the operator would be "+" and the code would be "PL 04".

Referring to FIG. 8, a View Definition General Sort Parameters Screen is used to control the sort levels for the view definition. The "sort levels" of a view definition indicates the column from the logical record or reference file by which the search results will be sorted. For example, if the sort field 70 of FIG. 8 is "customer name", the search results will be sorted by customer name when written in the extract file. If a second sort field 70 were defined as store number, then the search results will first be sorted by customer name and then be sorted by store number.

In order to exclude certain information from the extract file, the user enters the View Definition General Selection Parameters Screen (FIG. 9). This screen allows the user to include or exclude from the extract file logical records which have fields containing selected data. For example, if the user is not interested in any transaction of less than $200, then the field number for the "amount" field of the transaction record would be entered into the FLD NUM 90 field, the "selection from" field 81 would be set to "0", the "selection to" field 82 would be set to "200", and the include/exclude field 83 would be set to "E" for exclude. Where more than one selection criteria is set for a single "Field No.", then "OR" logic will be applied to the search results. Where different field numbers are set, "AND" logic will be applied. For example, assume the user was only interested in transaction in which the item sold at Store 93 was priced at $10 or $1050. Assuming Z04 represents the store field and H22 represents the price field and referring to FIG. 9, the above example can be implemented as follows: If the data in field H22 of the logical record (entry) is either 10 or 1050, and the data in field Z04 of that entry is 93, then that entry will be included in the extract file.

Referring to FIG. 10, a Column Selection Parameters Screen operates in the same manner as the General Selection Parameters Screen except the Column Selection Parameters Screen allows the user to include or exclude data from a particular column by specifying a column id 85.

A simple example may help to illustrate the above features. Assume that a user wished to create a document which listed, for the past 3 years, for each customer, each item purchased, the amount of the purchase, and the address and store number of the store at which the item was purchased.

The user would enter the View Definition Standard parameters menu and enter the identifier for the Purchase History Logical File. (FIG. 2a) in the Table (LR) Number Field 40. In the active date range Field 41, the user would input 01011991–99999999 (Jan. 1, 1991 to present). The rest of the entries could remain at the default values shown.

The user would then enter the View Definition Column Parameters Screen (FIG. 6). For column ID: 001 (column 1), the code for "customer": PH 20 (Purchase History Logical record (L.R. 20) is entered into Field Number 51. In the Column Heading field 52, the user may enter "CUS-TOMER". The user will then press "1" for "new column" and enter the information for col. 2 (ID: 002): field 51=PH 23 representing "item"; Field 52="ITEM"; then "1" again to enter information for column 3 (ID: 003) Field 51=PH 24 (representing "price"); Field 52="PRICE"; then "1" again to enter information for column 4 (ID: 004): Field 51=PH 21 (representing "store"); Field 52="STORE NO". The user will then press "1" to enter information for column 5 (ID: 005). Since the fifth column is for store addresses, Field No. 51 would reference column 2 (location 26) of reference table store 15 (RS 26), and the look-up path 54 will be PH 21, i.e., put the store address or location (RS 26) for the store number (PH 21) into the fifth column. The column heading in Field 53 could, for example, be "STORE LOCATION."

The user would then enter the General Sort Parameters screen (FIG. 8). The Sort Field 70 would be defined as PH 20 (customer) to indicate that the extract file will be sorted by customer name.

A resulting extract file 5000 for the above example would have 5 columns, labelled CUSTOMER, ITEM, PRICE, STORE NO., and STORE LOCATION. The resulting entries, retrieved from the Purchase History Logical File and Reference Table Store, will be listed by customer name as shown in FIG. 4.

A view definition which has been defined as described above is automatically transformed into various entries in the logic table. Once again using the example described above and illustrated in FIGS. 3–10, the conversion of the information input to the view screens (FIGS. 5–10) into a logic table will be described. FIG. 11 shows the logic table of FIG. 3 in greater detail.

In accordance with FIGS. 11A–11D, each logic table row comprises a plurality of fields. The first field 100 contains the row number of the logic table. The second field is the DDname field 101 which identifies the physical file which is the source of the logical records for the view. The value of this field is generated from the Table (LR) number 40 from the Standard Parameters Screen (FIG. 5). This field will have the same value for each row of a set in the logic table. The third field is view number 103 which contains the view number, (item 45 in FIG. 5), which is sequentially assigned to each view by the processor system.

Referring to FIG. 5, the entries on the Standard Parameters menu are transformed into logic table entries as follows. A new request row is created by entering "NR" into function code field 104. The automatically generated View Definition Number is entered into view number field 103 for each row belonging to that view. The value of the Table (LR) Number field 40 is transformed into fields 101 and 107 of each row of the logic table with field 101 indicating the physical file where the logical records are located and field 107 indicating the logical record type. The value of the active date range field 41 is used to determine which physical files of the logical record will be needed for this view. If more than one physical file is needed for the view, all of the rows for the view will be copied into the other sets as explained below. The extract file id field 42 is copied to a corresponding extract file no. field in the values field 120 of the NR row.

Referring to the Standard Column Parameters screen of FIG. 6 each column id field 50 will be copied to a separate row of the logic table. Referring to FIGS. 11A–11D, row 2 includes a DT function code to indicate that this line defines a column whose contents are to be retrieved from the logical record. Sort-column # field 105 indicates that row 3 is defining the first column of the extract file (col. id 001 from field 50 of FIG. 6). The field number field 108 is derived from the Field Number field 51 of the General Column Parameters screen. Row 2 also includes information regarding the format of the column in the values field 120, for example, the column width for column 1 from the column width field 53. Rows 3 through 5 similarly specify the contents of columns 2, 3, and 4 of the extract file.

Row 6 contains the information regarding the sort criteria specified in the General Sort Parameters menu of FIG. 8. The function code KT indicates that the extract file will be sorted by a field from a logical record. The sort-column field 105 indicates the sort number (in this case "1" because it is the first sort), and the Field No. 108 indicates the field of the logical record which the extract file will be sorted by. This entry is obtained from the sort field 70 of the General Sort Parameters screen of FIG. 8.

Row 7 is a write record line (WR). The WR line instructs the system to write a line of data to the extract file identified in the previous NR line (row 1).

Row 8 is an NR line for a second view (view #2). This view definition is contained in rows 8–20. Row 21 indicates an end of set (ES). This concludes the logic table entries for physical file 11.

Row 21 begins a second set which corresponds to physical file 12 of the logical file 10. In the example of FIGS. 11A–11D, the active date range entered in field 41 of the standard parameters menu for view 1 indicated that the second physical file of the logical record was needed for the search. As a result, the view definition of rows 1–7 of set 1 are automatically copied to lines 22–28 of set 2. However, the DDname field 101 is altered to identify physical file 12 instead of Physical File 11. Since the active date range of view 2 does not require information from physical file 2, rows 8–20 are not copied into set 2. Similarly, since the active date range of view 3 requires information from physical file 2 but not physical file 1, view 3 appears only in the second set. Row 40 is an end of logic table line (EN) which indicates that the end of the logic table has been reached.

In order to implement some of the other functions discussed above with regard to FIGS. 5–10, additional function fields are provided. For example, selection values specified in the General Selection Parameters or Column Selection Parameters screen, which select a single value, can be implemented utilizing an SE function code, entering the field no. 80 or 90 (of FIGS. 9 or 10) in the field number 108, and entering the value to be selected in the values field 120. Similarly, selection values specified in the General Selection Parameters or Column Selection Parameters screen, which specify a range of values, can be implemented utilizing an ST function code, entering the field no. 80 in the field number 108, and entering the range of values to be selected or excluded in the values field 120. For implementing the General Selection Parameters, the ST or SE line immediately follows the NR line. For implementing Column Selection Parameters, the ST or SE line immediately precedes the DT line which creates the column.

The include/exclude field (83, 93) of the General and Column Selection Parameter menus is implemented using the GO-TO-TRUE field 140 and GO-TO-FALSE field 141. For example, if we wish to exclude a logical record (entry) using the ST or SE lines discussed above, the exclude function can be implemented with a GO-TO-FALSE to the subsequent line and a GO-TO-TRUE to the next NR row (the next view). As a result, if the logical record satisfies the selection criteria defined by the ST or SE line, the thread will jump to the next NR row and the entry will be excluded. Otherwise, the thread will proceed to the next row of the logic table. Similarly an include function can be implemented with a GO-TO-FALSE to the next NR row and a GO-TO-TRUE to the subsequent line.

When the above functions are to be implemented utilizing information from a reference table, rather than the logical record, the procedure is similar. However, before a reference table is utilized, one or more look-up functions must be performed in order to relate the data in the reference table with the logical record data.

Assume, for example, that the user wishes to display, along with each store number extracted from the Purchase History Logical File 10, the corresponding location of the store in column 5. The store location information is contained in the Reference Table Store 15. Referring to FIG. 11E, in row 2 (as indicated in column 100) a "BC" function code (column 104) is used to designate access to a reference table from which to obtain the store address. The reference table number of the reference table store is entered in the value field 120 and the look-up field 109 is set to "Y". Then, in row 3, a "BT" function code, (column 104) taken with the field no. set forth in field 108, identifies the column of the logical record from which the key is to be built, i.e. the store no. column represented by the code "20". The current contents of the store no. column is then used to look-up an entry in the reference table store. If, for example, the contents of the store no. column identified store no. 9, then in row 4, an RL function code (column 104) is used to trigger a search of the reference table store for the entry for store 9 and to read the entire entry for store 9 from the reference table store.

Finally, in line 5, a DL function code (which corresponds to the DT function code described above with respect to data retrieved from logical records) instructs the system to store a selected field from the retrieved reference table entry as the contents of column 5 (sort-column 105=5). The selected field from the retrieved entry is identified in column 108. In this example field "20" of the reference table entry contains store location information. Since the DL function code applies only to columns generated from reference table data, the system knows that the contents of column 108 identifies the selected field of the retrieved reference table entry.

Referring once again to FIG. 3, the logic table contains a plurality of sets. Each set, in turn, can include a plurality of views. Each of the plurality of views must correspond to the physical file referenced by the set. As explained above with regard to FIG. 5, a view definition can also include date restrictions. For example, if a particular view definition included a date restriction which requests that only files for the current year are to be searched, then that view definition would appear only in the first set. If a second view definition had no date restriction, then that view definition, as well as all subsequent entries for that view definition, would be automatically copied to the second and third sets (assuming that the Logical File has 3 Physical files).

In accordance with the present invention, each set of the Logic Table corresponds to a separate "thread." A thread is a single sequential flow of control. As such, a single thread can, at any particular instant, have only a single point of execution, i.e., at any point in time a single thread can execute, at most, one instruction. By providing multiple threads, however, a single program can have multiple points of execution, one for each thread. In accordance with the present invention, a plurality of threads, one for each set in the logic table, run in parallel.

For example, if a logic table has three threads (i.e., three sets) and there are three processors in the computer, a different processor can run each thread. Since each thread corresponds to a different Physical File 11-13 of the Logical File 10, each thread can process its respective physical file 11-13 in parallel with the other threads thereby increasing efficiency considerably.

Once the logic table has been created, it essentially operates as a source program which consistency controls the manner in which the system processes the database, with the GO-TO-TRUE and GO-TRUE-FALSE fields controlling the sequence in which the logic table rows are implemented by the system.

Figure 16:
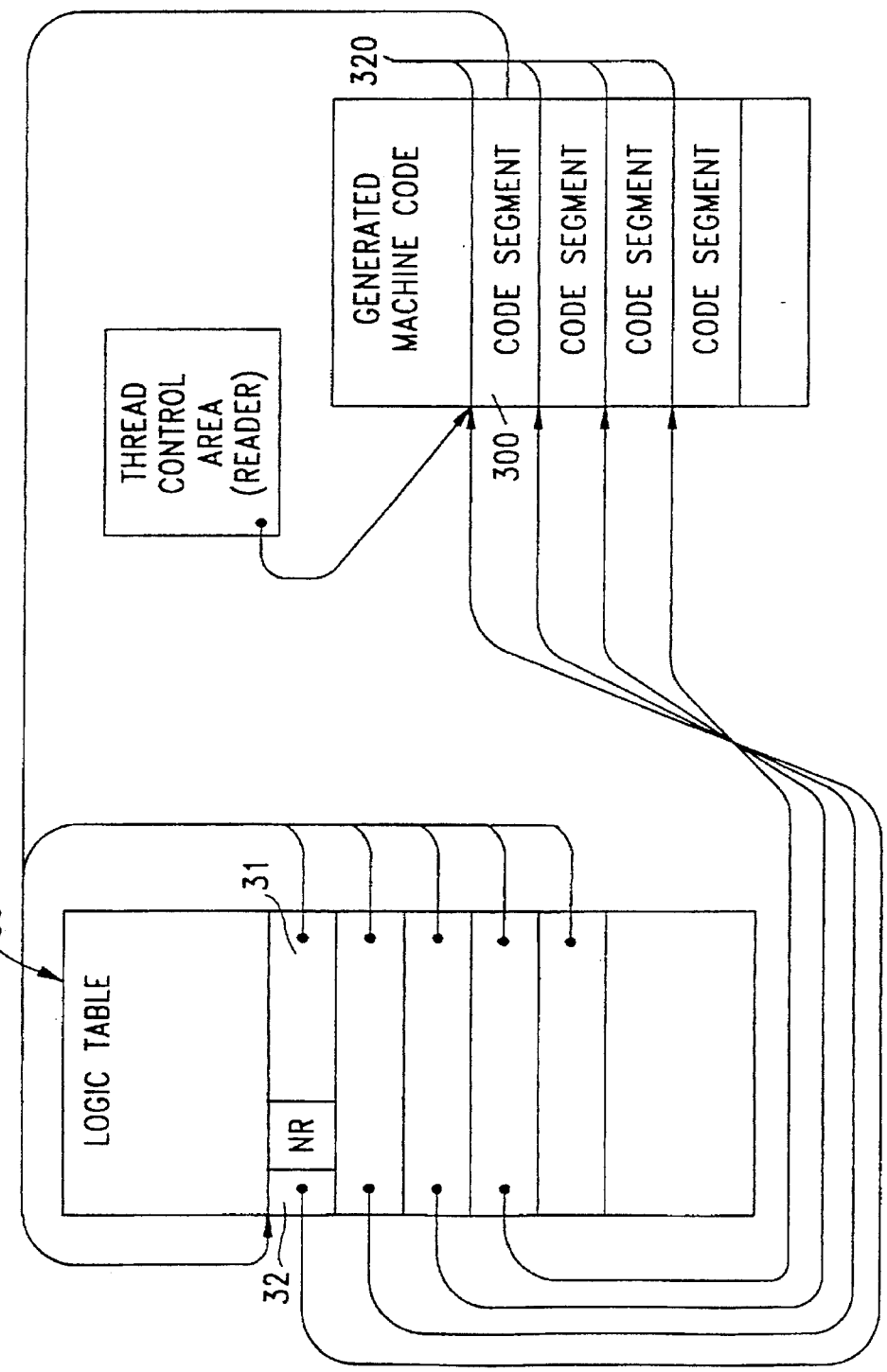
FIG. 16 illustrates the generation of machine code from a logic table.

More specifically, the logic table entries are translated into machine code as follows: Referring to FIG. 16, each logic table line 31 of logic table 30 has an address prefix 32 appended thereto which corresponds to the beginning address 320 of a segment of machine code which comprises the instructions for implementing the logic table line. The prefix 32 of each logic table line allows the code segments 300 to access the logic table and use the fields of the logic table lines 31 as data.

For each thread, which comprises the machine code instructions generated from its respective set of the logic table, one pass is made through the respective physical file in accordance with the sequence of instructions generated in the logic table as described above. During this single pass, all views in the corresponding set are processed in a sequence which is dictated by the logic table entries, particularly the GO-TO-TRUE/FALSE 140-141 fields of the logic table rows.

Referring, for example, to the logic table of FIGS. 11A-11D, in set 31, rows 1-6 constitute view 1 and rows 8-20 constitute a view 2; in set 32, rows 22-28 are copied from rows 1-6 and define the view 1, and rows 29-38 define a view 3. Each of rows 1-40 will be transformed into segments of machine code 300 as illustrated in FIG. 16.

Thread 1 is associated with physical file 11 and corresponds to set 31, which includes views 1 and 2. Thread 1 will access a first entry of physical file and perform the following steps:

1. designate extract file no. 01 for view 1 (row 1 "nr"); create an extract entry for view 1 by: putting the customer field 20 in column 1 of the extract entry (row 2 "DT"); putting the item field 23 in column 2 of the extract entry (row 3 "DT"), putting the price field 24 in column 3 of the extract entry (row 4 "DT"); putting the store number field 21 in column 4 of the extract entry (row 4 "DT"); putting the customer name 20 (row 5 "KT") into the sort key in preparation for sorting the extract entry with extract entries previously written to the extract file; writing the extract entry to the proper location in the designated extract file (row 7 "WR");

2. designate extract file no. 02 for view 2 (row 8 "nr"); create an extract entry for view 2 by executing the instructions of rows 8-19 (not shown); writing the extract entry to the proper location in extract file 02 (row 20 "WR"); and 3. Repeating steps 1-2 for the next entry in the physical file 11.

Thread 2 is associated with physical file 12 and corresponds to set 32, which includes views 1 and 3. Thread 2 will operate in parallel with Thread 1, accessing a first entry of physical file 12, and performing the following steps:

1. designate extract file no. 01 for view 1 (row 22 "nr"); create an extract entry for view 1 by: putting the customer field 20 in column 1 of the extract entry (row 23 "DT"); putting the item field 23 in column 2 of the extract entry (row 24 "DT"), putting the price field 24 in column 3 of the extract entry (row 25 "DT"); putting the store number field 21 in column 4 of the extract entry (row 26 "DT"); putting the customer name 20 (row 27 "KT") into the sort key in preparation for sorting the extract entry with extract entries previously written to the extract file; writing the extract entry to the proper location in the designated extract file (row 28 "WR"); and 2. designate extract file no. 03 for view 3 (row 29 "nr"); create an extract entry for view 3 by executing the instructions of rows 30-38 (not shown); writing the extract entry to the proper location in extract file 03 (row 38 "WR"); and 3. Repeating steps 1-2 for the next entry in the physical file 12.

Once the threads complete the above procedure, each extract file is sorted in accordance with the sort fields specified by each view definition.

As a result, the present invention generates a custom program which is used to traverse a logical file of an events database. Moreover, by generating separate threads for each separate physical file searched within the logical record, some or all of the physical files can be processed concurrently by separate threads thereby increasing the speed at which the database is searched. In addition, processing time is further reduced because each physical file is traversed only once regardless of the number of views specified with respect to each physical file.

Processing time is further reduced in accordance with the present invention through efficient management of input buffers, output buffers, and reference file information. Specifically, by utilizing an overlapped I/O feature according to an embodiment of the present invention, overall processing time for traversing a logical file is reduced by selecting the size of the input and output buffers based upon the nature of the physical medium in which the physical files of the logical file are stored. Moreover, by creating a reference table subset in main memory, which includes only selected portions of the reference tables required by the logic table, the need to access reference tables from external storage devices can be greatly reduced, and in some cases, eliminated completely.

Once the logic table has been generated (but before generation of the machine code or processing of the logical records), input and output buffers are allocated for the process.

In order to process the logical record 10, the event data contained in the physical files 11-13 must be loaded from their external medium (e.g. disk, or tape drive) into input buffers in main memory.

Figure 12:
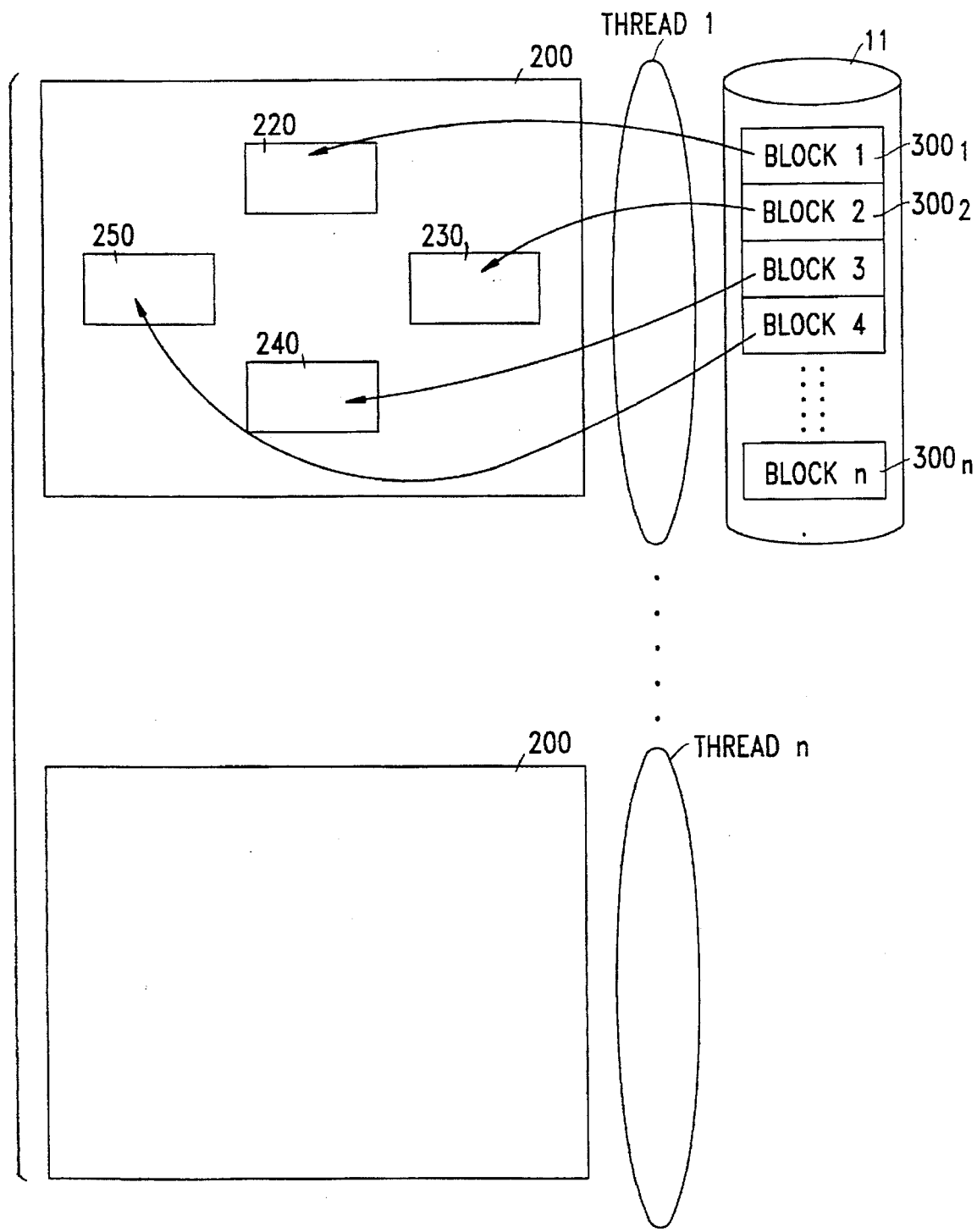
FIG. 12 shows input buffering in accordance with an embodiment of the present invention.

In accordance with an embodiment of the present invention, processing time is further reduced by providing an overlapped I/O function for the input buffers. Referring to FIG. 12, an input buffer set 200 is allocated for each set 31-33 of the Logic Table 30 so that each thread operates on a separate input buffer set. In accordance with an embodiment of the present invention, a plurality of buffers 220, 230, 240, 250 are allocated for each thread and each buffer 220-240 holds one block of data $300_n$.

The size of a block of data $300_n$ is selected as a function of physical characteristics of the physical file 11 in order to provide a further reduction in the processing time. One of the most time consuming tasks associated with processing a large file is data transfers to and from external devices. Moreover, the most time consuming task associated with a disk or tape transfer is the movement of the mechanical components of the drive itself.

As such, by transferring data blocks from the physical file to the input buffers in the same sequence they are recorded, delays associated with switching from one block to the next are minimized.

Once the thread loads block $300_1$ into buffer 220, the processing of buffer 220 begins. However, while thread 1 is processing buffer 220, another processor in the system fills buffer 230 with block $300_2$. Optimally, by the time thread 1 finishes processing block $300_4$, buffer 220 has been reloaded with block 5. The processing speed is further enhanced as a result of this overlapped I/O feature according to an embodiment of the present invention.

Figure 13:
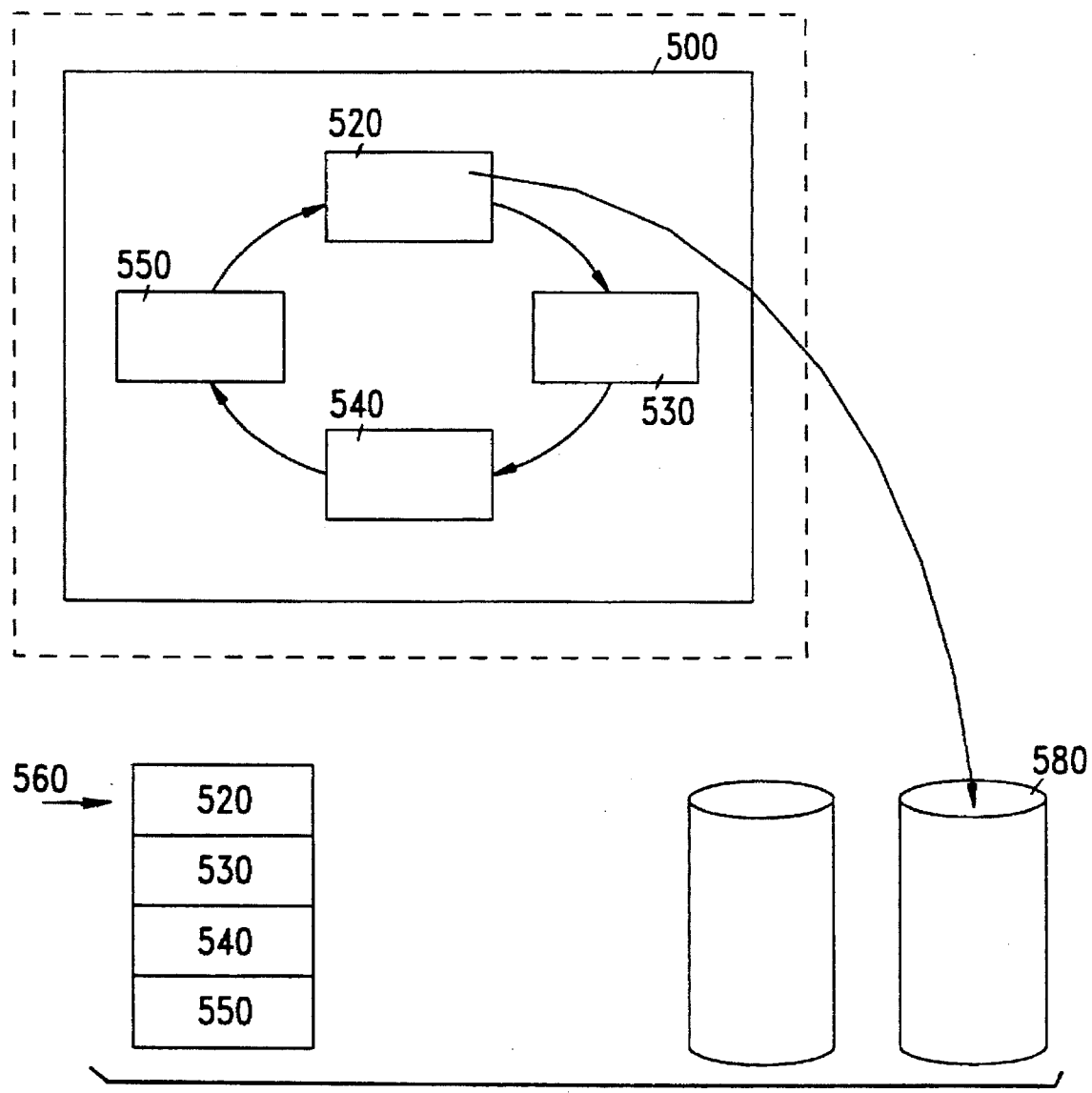
FIG. 13 shows output buffering in accordance with an embodiment of the present invention.

In addition to allocating input buffers, output buffer sets 400 are also allocated based upon the logic table as shown in FIG. 13. Each output buffer set 500 corresponds to a separate extract file. As discussed supra, each view designates an extract file to hold the results of the process for that view. The extract file number is selected from the View Definition Standard Parameters Screen, and appears in an Extract File No. field of the values field 120 of the corresponding NR line of the logic table. An output buffer set 500 will be allocated for each extract file designated in the logic table.

Since the output buffers 500 are segregated not by thread number, but by extract file number, the output buffer 500 for an extract file, may hold data from a number of different threads and from a number of different views. However, all data for any particular view is preferably written to the output buffer set 500 of a single extract file since that data will eventually be written to a single output file.

Referring to FIG. 13, Extract File 5000 includes an output buffer set 500. Output buffer set 500, in turn, includes a plurality of buffers 520, 530, 540, 550. As with buffers 220–250 of FIG. 12, the buffers 520–550 each hold a single block of data, wherein the size of the block of data is set as a function of the nature of the physical medium to which the Extract file 5000 is written.

The Extract File 1000 is processed as follows. A pointer 560 initially points, for example, to buffer 520. While the pointer 560 points to buffer 520, any thread which is executing a write function (WR line of the logic table) to Extract file 5000 will write data into the next available location in buffer 520. If that thread determines that buffer 520 is full, then the thread will move the pointer to buffer 530 and then initiate a transfer of the data block in buffer 520 to a designated external medium.

As a result, while the contents of buffer 520 are being written to an external medium 580, data can still be written into buffer 530. Moreover, since the size of buffers 520–550 is set as a function of the physical characteristics of the external medium 580, the time required to transfer data from the buffer 520–550 is minimized.

As set forth above, in accordance with another embodiment of the present invention, processing time is further reduced by creating a reference table subset in main memory which includes only selected portions of the reference tables required by the logic table, thereby reducing or eliminating the need to access reference tables from external storage devices and reducing processing time.

After the input and output buffers are allocated as described above (and before machine code generation and searching), the system loads some or all of the needed data from the reference tables into main memory. Like logical records, reference tables are stored on external mediums such as hard disks, or tape. Once the logic table has been generated, the system determines which columns of which reference tables are needed to complete the process. Once this determination is made, the system forms a reference table subset in main memory which includes only the columns of the reference tables which are needed for processing.

Figure 14:
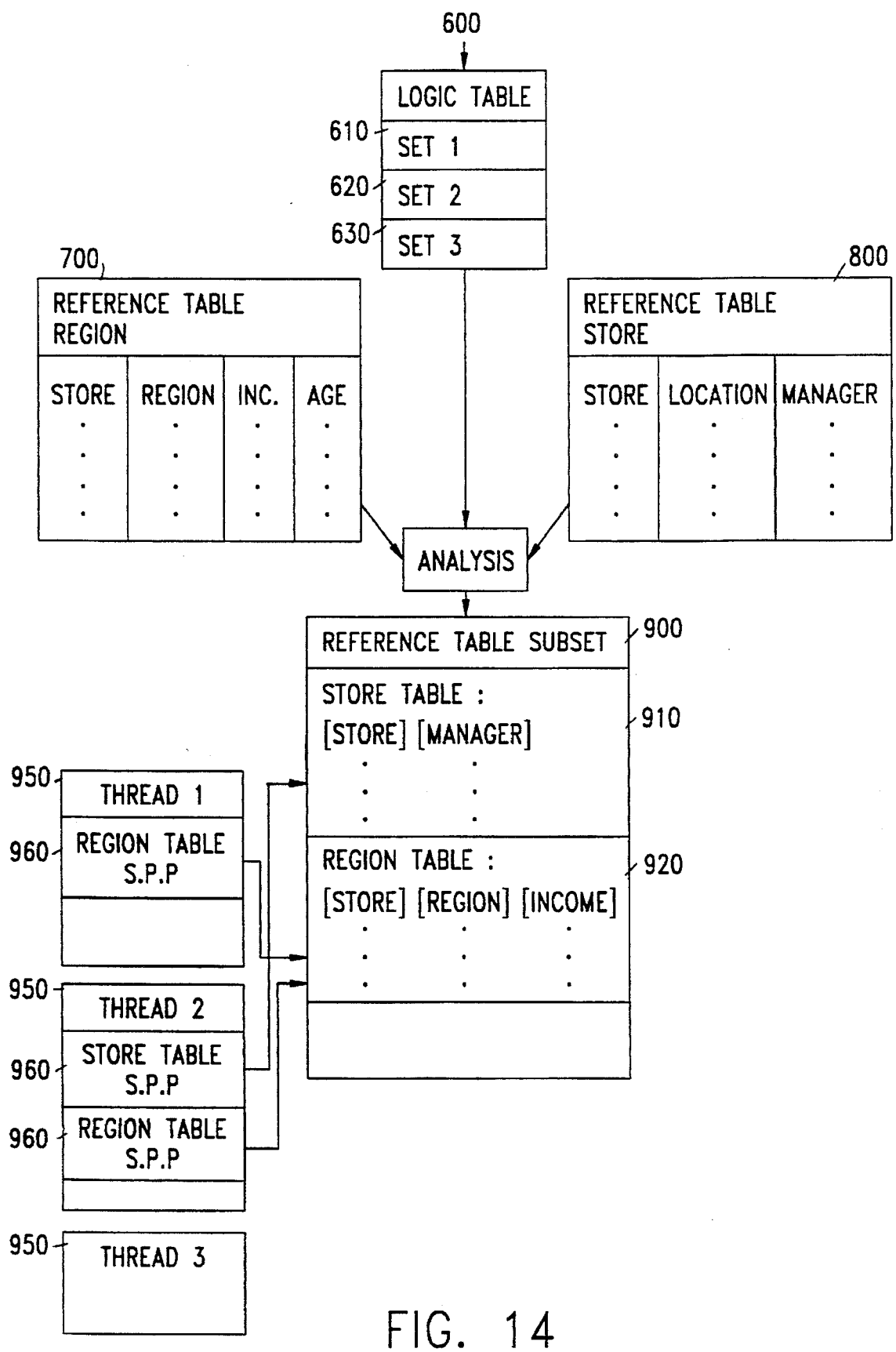
FIG. 14 shows a reference table subset feature of the present invention.

Referring to FIG. 14, assume that a logic table 600 includes lines which reference Reference Table Region 700 and Reference Table Store 800. Reference Table Region 700 includes columns for "store", "region", "median income", and "median age." Reference Table Store 800 includes columns for "store", "location," and "manager." Assume that the logic table 600 only includes lines which reference the store and manager columns of Reference Table Store and the store, region, and income columns of Reference Table Region.

In accordance with the above-mentioned embodiment of the present invention, a reference table subset 900 is created in memory, the reference table subset 900 including a store table portion 910 and a region table portion 920, the store and manager columns of reference table store 800 being stored in the store table portion 910 and the store, region, and income columns of the reference table region 800 being stored in the region table portion 920.

If a needed reference table cannot fit into the space allocated for the reference table subset 900, then that reference table is accessed from physical storage during the search.

By storing as many of the needed reference tables as possible in the reference table subset 900, processing time is further reduced by eliminating the need to retrieve the information from an external medium during the search.

Once the reference table subset 900 is generated, a set of processing parameter pointers are formed for each thread. Each thread 950 includes a processing parameter pointer 960 for each reference table (910, 920) in the reference table subset 900 which that thread needs to complete its search. In the example illustrated in FIG. 14, the logic table includes three sets, $set_1$ 610 which corresponds to $thread_1$ 950 and which requires reference table region, $set_2$ 620 which corresponds to $thread_2$ 950 and which requires reference table store and reference table region, and $set_3$ 630 which corresponds to $thread_3$ 950 and which does not require any reference table in the reference table subset 900.

The processing parameter pointers 960 are initially set to the midpoint of their respective tables in the reference table subset. At the first point in the search at which a reference table is accessed, i.e. the first RL line of the set in the logic table, the entry at the midpoint is accessed. If the entry does not match the request, then the processing parameter pointer 960 is moved to a midpoint between the prior position and the beginning of the reference table portion (910 or 920) if the prior position was too low, and to a midpoint between the prior position and the end of the reference table portion (910 or 920) if the prior position was too high, until the proper entry is reached. In this manner a binary search is conducted through a portion of the reference table subset in order to locate the requested entry.

Figure 15:
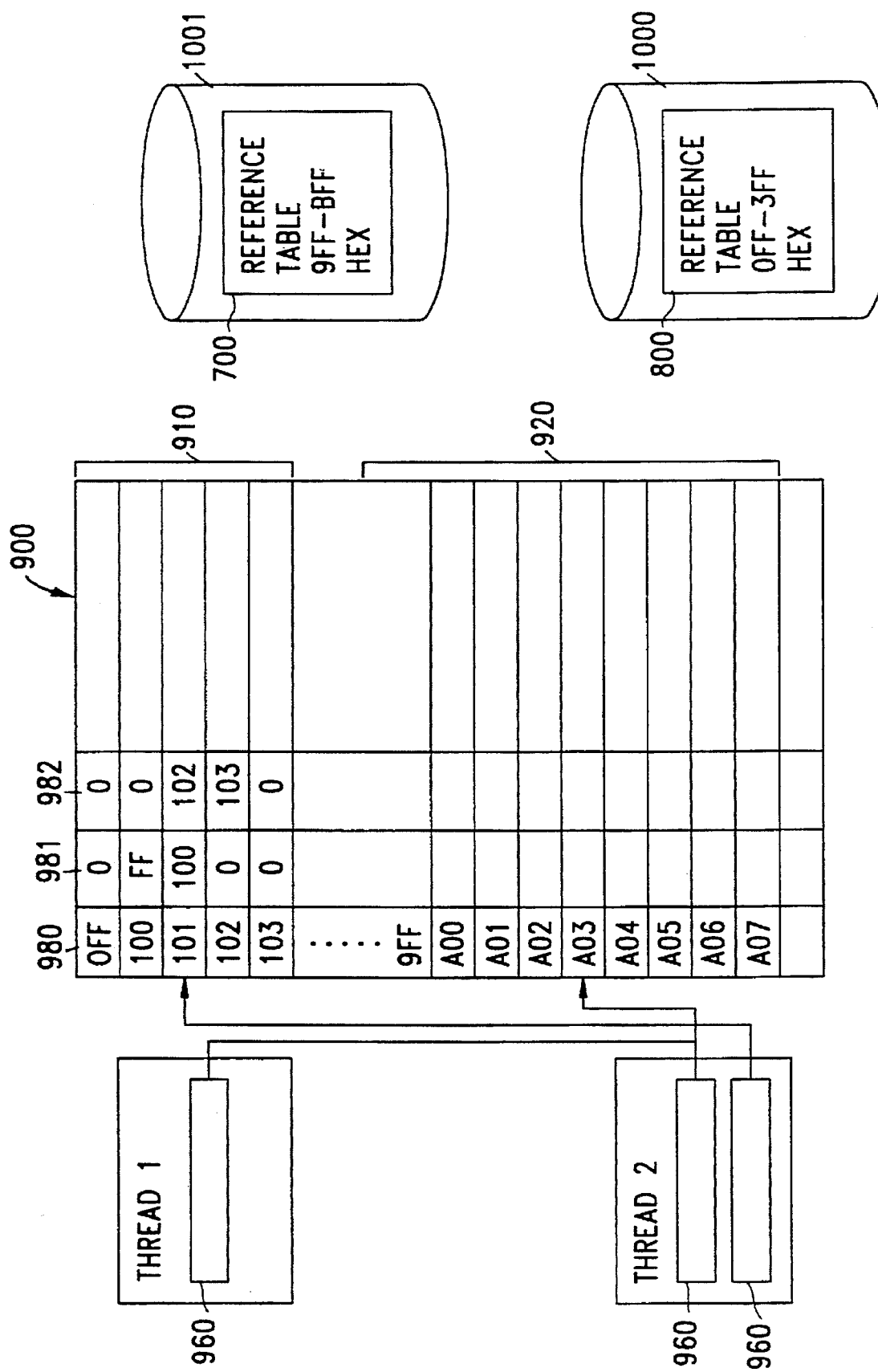
FIG. 15 shows the reference table subset feature of FIG. 14 in more detail.

Referring to FIG. 15, reference table store 800 is located in address locations 0ff-103 Hex in external medium 1000 and reference table region 700 is located in address locations 9ff-a07 Hex in external medium 1001. When reference table store 800 and reference table region 700 are copied into the reference table subset 900, for each reference table location 985, the results of the above-mention binary search are pre-coded into a first and second prefix 981, 982 of that location 985.

For example, since the reference table location midway between reference table location 101 and the beginning of the store table portion 910 is location 100, the first prefix 981 of reference table location 101 will be 100. Similarly, since the reference table location midway between reference table location 101 and the end of the store table portion 910 is location 102, the second prefix 981 of reference table location 101 will be 102.

Initially, the processing parameter pointers 960 will be set to the midpoint of their respective reference table portions 910, 920; i.e. to 101 hex for reference table store and to a03 hex for reference table region.

The first time thread 2 accesses the reference table subset for the store table, it will access location 101 Hex. Assume, for example, that thread 2, in accordance with the entries of the second set of the logic table, is looking for a corresponding store address for store number 94.

If location 101 Hex has the entry for store 94, the store location will be retrieved and the pointer 960 for the store table portion 910 will remain at 101 hex. If, however, location 101 Hex has, for example, the entry for store 74, then the pointer 960 will set to the value stored in the second pre-fix of location 101 hex (which, as described above, corresponds to a midpoint between 101 Hex and 103 Hex) and the process will be repeated until the entry for store 94 is located.

As a result, the addition of the first and second prefixes to the reference table subset further increases the processing speed of the system in accordance with the present invention because it eliminates the need to calculate, during the search process, the next location of the reference table subset to be accessed in accordance with the binary search.

While the present invention has been described above with regard to creating views from a single logical file, it is also possible, in accordance with the present invention, to create a super-view, which contains information from a plurality of logical files. In accordance with this aspect of the present invention, a logic table is created for each logical file, with each logic table including individual views which designate and format the information their respective logical records. Each view in the super view designates the same extract file for output, and moreover, each view in the super view has at least one field in common with the other views in the super-view.

Each logic table is processed into machine code and applied as a search algorithm to their respective logical files as described above. After all of the logical files designated in the super-view have been traversed, the designated extract file for the super-view is sorted by view number and by the common field of the views of the super-view and stored in a designated output file. Assuming, for example, that the common field of the views of the super-view was a customer name field, then the output file would have the following format:

```
CUSTOMER 1 . . . VIEW 1 EXTRACT FILE OUTPUT
CUSTOMER 1 . . . VIEW 2 EXTRACT FILE OUTPUT
        .
        .
        .
CUSTOMER 1 . . . VIEW N EXTRACT FILE OUTPUT
CUSTOMER 2 . . . VIEW 1 EXTRACT FILE OUTPUT
CUSTOMER 2 . . . VIEW 2 EXTRACT FILE OUTPUT
CUSTOMER 2 . . . VIEW 3 EXTRACT FILE OUTPUT
        .
        .
        .
CUSTOMER 2 . . . VIEW N EXTRACT FILE OUTPUT
```

In the above manner, an output file can be created which includes information from a plurality of views. Naturally, once this output file (or any extract file produced as described above) is generated, the contents of the file can be processed in a conventional manner to produce reports or other documents in any desired format.

What is claimed is:

1. In a system including two or more processors, a computer implemented method for traversing one or more logical files, the logical files including two or more physical files of a transactional database, the method comprising the steps of:

generating one or more sets of parameters for processing the two or more physical files of the transactional database;

assigning a respective thread to each of the two or more physical files of the transactional database, each respective thread including instructions for processing its respective one of the two or more files of the transactional database in accordance with preselected ones of the one or more sets of processing parameters;

sequentially traversing each of the two or more files of the transactional database once in accordance with its respective thread, at least two of the threads operating in parallel;

retrieving, in accordance with the instructions for each thread, information from the respective one of the two or more physical files of the transactional database associated with said thread based upon the preselected ones of the one or more sets of processing parameters associated with said thread;

storing the information retrieved by each thread in an output file.

2. The method according to claim 1 wherein the two or more files reside on one or more external mediums.

3. The method according to claim 2, further comprising the steps of:

associating an input buffer set with each of the two or more files, each input buffer set including two or more input buffers;

retrieving data blocks from each of the two or more files into respective ones of the two or more input buffers, in a same sequence as said data blocks are recorded on the physical medium.

4. The method according to claim 2, wherein the one or more external mediums include one or more of a tape drive, disk drive, a hard drive, an optical drive, a bubble memory and a flash memory.

5. In a system including two or more processors, a computer implemented method for traversing two or more physical files of a transactional database which correspond to a logical file based upon one or more view definitions, the method comprising the steps of:

a) creating one or more view definitions, each view definition defining a set of processing parameters for selected ones of the two or more physical files of the transactional database;

b) creating a logic table, the logic table including a logic table set for each of the two or more physical files of the transactional database;

c) transforming the set of parameters for each view definition into a respective plurality of logic table entries, the plurality of logic table entries being copied into the logic table sets which correspond to the selected ones of the two or more physical files which correspond to the sets of parameters defined by each view definition;

d) associating a respective one of a plurality of threads with each logic table set;

e) transforming the logic table entries of each one of the plurality of threads, which correspond to each view definition associated with said each thread, into a set of instructions for said each thread;

f) operating each thread in accordance with its set of instructions:

to access each entry of its respective one of the two or more physical files of the transactional database, to retrieve information from said entry based upon the view definitions associated with said thread, and to store said retrieved information in one or more extract files based upon the view definitions associated with said thread, at least two of the plurality of threads operating in parallel.

6. The system according to claim 5, wherein the logic table is implemented as a "non-procedural" language.

7. The method according to claim 5, wherein the two or more files reside on one or more external mediums.

8. The method according to claim 7, wherein the one or more external mediums include one or more of a tape drive, a disk drive, a hard drive, an optical drive, a bubble memory and a flash memory.

9. The method according to claim 7, further comprising the steps of associating an input buffer set with each of the two or more files, each input buffer set including two or more input buffers;

retrieving data blocks from each of the two or more files into respective ones of the two or more input buffers, in a same sequence as said data blocks are recorded on the physical medium.

10. The method according to claim 7, further comprising the steps of:

a) associating an output buffer set with each of the one or more extract files, each output buffer set including one or more output buffers;

and wherein the step of operating each thread to store said retrieved information in one or more extract files further includes the steps of b) storing said information retrieved by said each thread in a current one of the one or more output buffers associated with a one of the one or more extract files;

c) determining whether said current one of the one or more output buffers is full, and, when said current one of the one or more output buffers is determined to be full, 1) initiating a transfer of the current one of the one or more output buffers to its associated extract file, and 2) designating another one of the output buffers as the current one of the one or more output buffers.

11. A parallel processing system for traversing a logical file of a transactional database, the logical file including two or more physical files, the parallel processing system comprising:

an input buffer for retrieving blocks of data from the two or more physical files of the transactional database;

an output buffer for storing blocks of data in one or more extract files;

a logic table storing one or more sets of processing parameters, each set of processing parameters corresponding to a respective view definition, each view definition defining criteria for retrieving information from one or more files of the logical record, each view definition further defining a format of a designated one of the extract files, the logic table including at least two logic table sets, each logic table set associated with a respective file of the two or more files of the transactional database, each logic table set including the respective set of processing parameters associated with each view definition which defines criteria for retrieving information from the respective file associated with said logic table set;

a corresponding thread associated with each logic table set, each thread implementing the sets of processing parameters associated with its respective logic table set, each thread sequentially accessing entries from the file of the transactional database associated with its respective logic table set, each thread applying each of its sets of processing parameters to each accessed entry such that each entry is accessed only once, each thread retrieving information from each accessed entry in accordance with its sets of processing parameters and storing the retrieved information in the designated extract files, via the output buffer, in the respective formats defined by the view definitions corresponding to the sets of processing parameters.

12. The system according to claim 11, wherein the logic table is implemented as a "non-procedural" language.

13. The system according to claim 11, wherein the input buffer includes a corresponding input buffer set for each thread, each corresponding input buffer set including one or more input buffers, each input buffer for storing a retrieved data block, a size of the data block being selected as a function of a physical medium from which the data block was retrieved.

14. The system according to claim 11, wherein the output buffer includes a corresponding output buffer set for each extract file, each corresponding output buffer including one or more output buffers, each output buffer for holding a data block for storage in the extract file associated with the corresponding output buffer, a size of each data block being selected as a function of a physical medium in which the extract file resides.

15. The system according to claim 13, wherein the thread associated with the one or more input buffers of each input buffer set implements its sets of processing parameters on a current one of the one or more input buffers while another processor retrieves a next data block from the one of the two or more files associated with the thread.

16. The system according to claim 14, wherein each thread, prior to storing the retrieved information in the output buffer set corresponding to the designated extract file, determines whether a current output buffer of the output buffer set corresponding to the designated extract file is full, and, if the current output buffer is not full, stores the retrieved information in the current output buffer, and if the current output buffer is full, initiates a transfer of the current one of the one or more output buffers to the designated extract file and designates another one of the output buffers as the current one of the one or more output buffers.

17. The system according to claim 13, wherein each input buffer set includes a plurality of input buffers.

18. The system according to claim 14, wherein each output buffer set includes a plurality of output buffers.

19. The system according to claim 13, wherein the physical medium includes one of a tape drive, a disk drive, a hard drive, an optical drive, a bubble memory and a flash memory.

20. The system according to claim 14, wherein the physical medium includes one of a tape drive, a disk drive, a hard drive, an optical drive, a bubble memory and a flash memory.

* * * * *